United States Patent
Istre et al.

(10) Patent No.: US 10,310,094 B2
(45) Date of Patent: Jun. 4, 2019

(54) RIG HEAVE, TIDAL COMPENSATION AND DEPTH MEASUREMENT USING GPS

(75) Inventors: Randall Gerard Istre, Lafayette, LA (US); Marco Antonio Zamora, Lafayette, LA (US); Harry Roger Page, Lafayette, LA (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 701 days.

(21) Appl. No.: 13/423,840

(22) Filed: Mar. 19, 2012

(65) Prior Publication Data

US 2013/0245951 A1  Sep. 19, 2013

(51) Int. Cl.
*G01S 19/39* (2010.01)
*G01S 19/14* (2010.01)

(52) U.S. Cl.
CPC .............. *G01S 19/39* (2013.01); *G01S 19/14* (2013.01)

(58) Field of Classification Search
CPC ......... G01V 1/42; G01V 1/3835; G01S 19/39
USPC .......................... 367/14, 21, 25, 38; 701/468
See application file for complete search history.

(56) References Cited

U.S. PATENT DOCUMENTS

| | | | | |
|---|---|---|---|---|
| 2,059,488 A | * | 11/1936 | Prikel | 102/216 |
| 3,931,735 A | * | 1/1976 | Guigmard | E21B 19/09 175/5 |
| 4,852,052 A | * | 7/1989 | Frey | E21B 19/09 175/40 |
| 6,212,476 B1 | | 4/2001 | Noy et al. | |
| 6,288,975 B1 | | 9/2001 | Frederick et al. | |
| 6,564,883 B2 | * | 5/2003 | Fredericks et al. | 175/50 |
| 6,728,165 B1 | | 4/2004 | Roscigno et al. | |
| 7,624,831 B2 | | 12/2009 | Orr et al. | |
| 7,974,150 B2 | | 7/2011 | Tulett et al. | |
| 8,305,230 B2 | * | 11/2012 | Weston | E21B 19/00 340/853.2 |
| 2005/0121230 A1 | * | 6/2005 | Baek et al. | 175/5 |
| 2006/0179934 A1 | * | 8/2006 | Smith | G01S 17/58 73/170.11 |
| 2006/0203614 A1 | * | 9/2006 | Harmon | 367/57 |
| 2006/0271299 A1 | * | 11/2006 | Ward et al. | 702/6 |
| 2008/0205191 A1 | * | 8/2008 | Coste et al. | 367/15 |

(Continued)

FOREIGN PATENT DOCUMENTS

| | | | | |
|---|---|---|---|---|
| CA | 2790881 A1 | * | 9/2011 | E21B 19/006 |
| JP | 2001040658 A | | 2/2001 | |

(Continued)

OTHER PUBLICATIONS

Rapatz, Vessel Heave Determination Using the Global Positioning System, 1991, Department of Surveying Engineering, pp. 1-129.*

(Continued)

*Primary Examiner* — Stephanie E Bloss
*Assistant Examiner* — Lisa E Peters
(74) *Attorney, Agent, or Firm* — Cantor Colburn LLP

(57) ABSTRACT

An apparatus for estimating a depth in a borehole penetrating the earth includes: a global positioning system (GPS) receiver disposed at a platform configured for conducting operations related to the borehole, the GPS receiver being configured to receive GPS signals related to a location of the GPS receiver; and a processor coupled to the GPS receiver and configured to estimate the depth in the borehole using GPS location data received from the GPS receiver.

24 Claims, 3 Drawing Sheets

(56) References Cited

U.S. PATENT DOCUMENTS

| | | | |
|---|---|---|---|
| 2009/0073805 A1* | 3/2009 | Tulett et al. | 367/24 |
| 2010/0098498 A1 | 4/2010 | Humphreys | |
| 2010/0224360 A1* | 9/2010 | MacDougall | E21B 17/07 |
| | | | 166/250.01 |
| 2010/0230370 A1* | 9/2010 | Schneider | B63B 27/10 |
| | | | 212/276 |
| 2010/0313646 A1* | 12/2010 | Mehta | E21B 47/00 |
| | | | 73/152.54 |
| 2011/0038226 A1 | 2/2011 | Scott | |

FOREIGN PATENT DOCUMENTS

| | | |
|---|---|---|
| JP | 2003302221 A | 6/2005 |
| KR | 1020100074739 A | 7/2010 |

OTHER PUBLICATIONS

Kai-Chien Cheng, Analysis of Water Level Measurements Using GPS, Geodetic Science and Surveying, Nov. 2005, report #476, Department of Geological Sciences, The Ohio State University, Columbus OH, 43210. 130 pages.

John D Hughes, Batch Drilling and Positioning of Ssubsea Wells in the South China Sea, Society of Petroleum Engineers, Nov. 14-17, 1995, pp. 217-226, SPE Paper No. 29909, Beijing China.

Notification of Transmittal of the International Search Report and the Written Opinion of the International Searching Authority, or the Declaration; PCT/US2013/030832, dated Jun. 24, 2013, 12 pages.

* cited by examiner

RIG HEAVE, TIDAL COMPENSATION AND DEPTH MEASUREMENT USING GPS

BACKGROUND

In the pursuit of hydrocarbons, many wells are being drilled in the marine environment. Some of the drilling rigs may be firmly planted on the ocean floor, while other drilling rigs may be floating types typically anchored in position or held in position by thrusters. Because the floating drilling rigs float at the surface of the water, they are subjected to heaving or movement from waves and tidal effects. Many functions, such as well logging, construction and completion for example, performed by the floating drilling rigs require a precise knowledge of the depth in a borehole beneath those rigs. However, the depth beneath of water beneath the floating drilling rigs can continuously change due to the waves and tidal effects and, thus, affect a measurement of depth in the borehole. Hence, it would be well received in the drilling industry if borehole depth measurements beneath drilling rigs could be improved.

BRIEF SUMMARY

Disclosed is an apparatus for estimating a depth in a borehole penetrating the earth includes: a global positioning system (GPS) receiver disposed at a platform configured for conducting operations related to the borehole, the GPS receiver being configured to receive GPS signals related to a location of the GPS receiver; and a processor coupled to the GPS receiver and configured to estimate the depth in the borehole using GPS location data received from the GPS receiver.

Also disclosed is a method for estimating a depth in a borehole penetrating the earth. The method includes: receiving GPS data related to a location of a platform for conducting operations related to the borehole from a GPS receiver coupled to a platform, the receiving being performed using a processor; and estimating the depth in the borehole using the GPS data, the estimating being performed by the processor.

Further disclosed is a non-transitory computer readable medium comprising computer executable instructions for estimating a depth in a borehole penetrating the earth by implementing a method that includes: receiving from a GPS receiver coupled to a platform for conducting operations related to the borehole GPS data related to a position of the platform; and estimating the depth in the borehole using GPS position data received from the GPS receiver.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
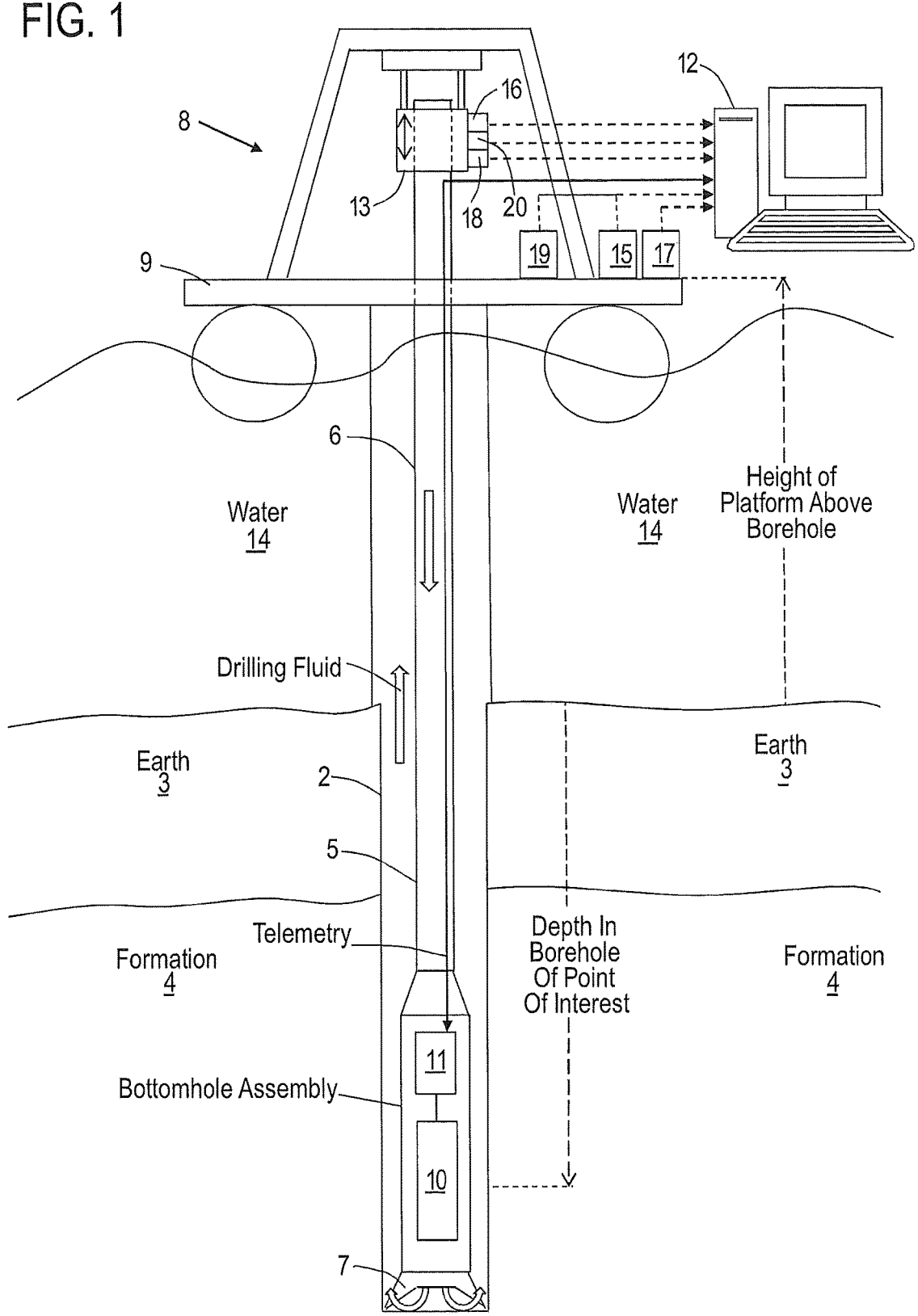
FIG. 1 illustrates an exemplary embodiment of a downhole tool disposed in a borehole penetrating the earth.

FIG. 1 illustrates a cross-sectional view of an exemplary embodiment of a downhole tool 10 disposed in a borehole 2 penetrating the earth 3, which includes an earth formation 4. The downhole tool 10 may represent one or more tools that can be disposed in the borehole 2 to perform various functions such as well logging, construction or completion. The formation 4 represents any subsurface material of interest. The downhole tool 10 is conveyed through the borehole 2 by a carrier 5. In the embodiment of FIG. 1, the carrier 5 is a drill string 6 in an embodiment known as measurement while drilling (MWD) and/or logging-while-drilling (LWD). Disposed at a distal end of the drill string 6 is a drill bit 7. A drilling rig 8, disposed on a platform 9, is configured to conduct drilling operations such as rotating the drill string 6 and thus the drill bit 7 in order to drill the borehole 2. In addition, the drilling rig 8 is configured to pump drilling fluid through the drill string 6 in order to lubricate the drill bit 7 and flush cuttings from the borehole 2. The platform 9 represents any platform or structure configured to conduct operations related to the borehole 2 such as drilling, well completion (e.g., component installation, repair, and modification), well construction, and subsea repair. Disposed at the drill rig 8 is a block 13, which is coupled to the drill string 6 and configured to support or hoist the drill string 6. In general, as the borehole 2 is being drilled, the block 13 travels towards the borehole at the rate of penetration into the earth 3.

In the embodiment of FIG. 1, the platform 9 is configured to float on water 14 above the borehole 2 for marine or offshore operations. Downhole electronics 11 are configured to operate the downhole tool 10, process measurements or data received from the tool 10, and/or record data for later retrieval. Telemetry is used to provide communications between the downhole tool 10 and a computer processing system 12 disposed at or remote to the platform 9. Measurement data processing or operations can also be performed by the computer processing system 12 in addition to or in lieu of the downhole electronics 11. The downhole tool 10 may operate intermittently, at particular intervals, or continuously during the drilling process. In an alternative embodiment, the carrier 5 can be an armored wireline in an embodiment known as wireline logging. In wireline logging, the wireline can include electrical conductors for communications.

Still referring to FIG. 1, a global positioning system (GPS) receiver 15 is disposed on the platform 9. The GPS receiver 15 is configured to receive GPS signals from a constellation of satellites and to determine the location or position of the receiver 15 in three-dimensions using those signals. Another GPS receiver 16 is disposed on the block 13. Co-located with the GPS receivers 15 and 16 are accelerometers 17 and 18 and gyroscopes 19 and 20, respectively. The accelerometers are configured to measure acceleration in any of one, two or three directions, generally orthogonal to each other, but they don't have to be orthogonal to each other. The gyroscopes are configured to detect or measure orientation by measuring deviation from a reference orientation. Thus, the gyroscopes can measure movement of the platform 9, such as pitching or rolling, with respect to the reference orientation. The GPS receivers 15 and 16, the accelerometers 17 and 18, and the gyroscopes 19 and 20 are coupled to the computer processing system 12 in order for the computer processing system 12 to receive location data, acceleration measurements, and orientation measurements from the GPS receivers 15 and 16, accelerometers 17 and 18, and the gyroscopes 19 and 20 respectively.

The computer processing system 12 using locations continuously received from the GPS receiver 15 can calculate a displacement of the platform 9. The GPS receiver 15 is coupled to the platform 9 such that movement of the GPS receiver 15 corresponds to movement of the platform 9. In one or more embodiments, the displacement is calculated by computing the difference between two received locations. The calculated difference can be represented as a three-dimensional vector representing distance and direction. A vertical component of the vector may represent a vertical displacement of the platform 9.

Figure 2:
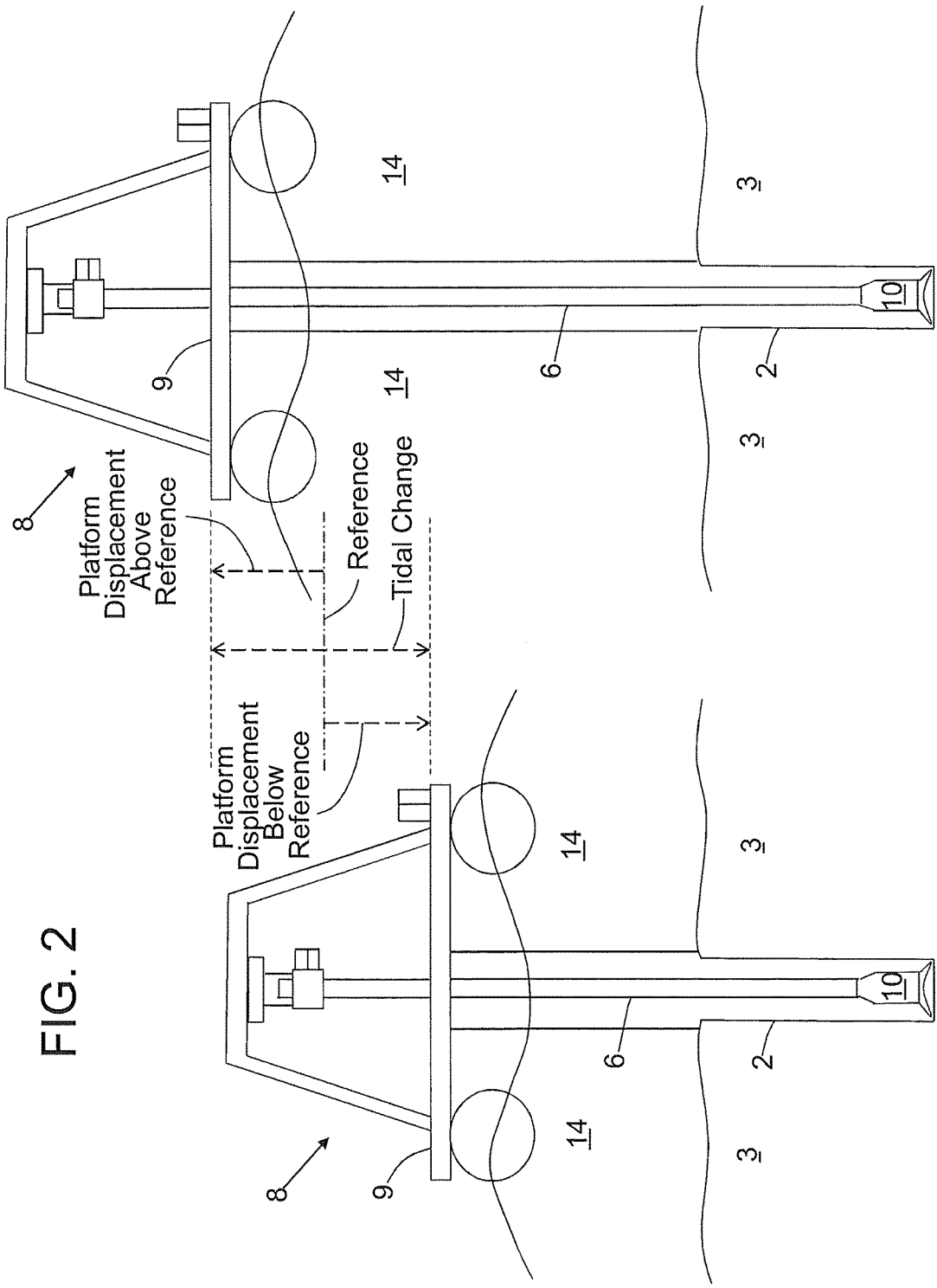
FIG. 2 depicts aspects of tidal changes on measuring a depth in the borehole.

In one or more embodiments, the vertical displacement can be used to correct or compensate a depth measurement in the borehole 2 for vertical movement of the platform 9. FIG. 2 depicts aspects of the platform 9 at low tide and at high tide. The borehole depth measurement may be computed as a component of the total distance from the platform 9 to the downhole tool 10. Hence, the borehole depth measurement may represent a measured depth of the downhole tool 10 in the borehole 2 that does not account for movement of the platform 9. For example, if the platform rises in the ocean due to wave peaks or tidal effects, the depth measurement may be greater than the actual depth of the tool 10 in the borehole 2 reflecting increased height or water depth of the platform 9 above the entrance to the borehole 2. In this situation, the vertical displacement may be subtracted from the depth measurement to provide a more accurate compensated borehole depth measurement. Conversely, if the platform falls in the ocean due to wave troughs or tidal effects, the borehole depth measurement may be less than the actual depth of the tool 10 in the borehole 2. In this situation, the vertical displacement may be added to the depth measurement to provide a more accurate compensated borehole depth measurement. For other types of borehole depth measurement system configurations, the above algorithm may be reversed (i.e., subtraction instead of addition and addition instead of subtraction). It can be appreciated that various technologies relating to various physical parameters (e.g. pressure) may be used to measure a particular depth in a borehole and that compensation of the depth measurement due to platform movement may depend on the physics and actual embodiment of the technology employed. For example, a technology used to measure a depth of the downhole tool 10 in the borehole 2 for logging purposes may be different from the technology used to measure a borehole depth of a different type of downhole tool relating to a point of interest in a casing lining the borehole 2. Regardless of the technology and embodiment of the borehole depth measuring system, the teachings disclosed herein related to correcting or compensating a measurement of a depth in the borehole 2 are applicable.

In one or more embodiments, output from the accelerometer 17 may be used in conjunction with output from the GPS receiver 15 to improve the accuracy of measurements of displacement of the platform 9. For example, the GPS receiver 15 may be configured to establish a reference position such as a point, line, or elevation and the accelerometer 17 may be used to measure displacement of the platform 9 from the reference position using double integration of the accelerometer output. It can be appreciated that the computer processing system in conjunction with input from at least one accelerometer and at least one gyroscope can operate as an inertial navigation system to measure movement of the platform 9 with respect to a point in the borehole in order to determine the displacement of the platform 9. Similar to determining displacement of the platform 9 using the GPS receiver 15, the inertial navigation system can determine the displacement by calculating the change (i.e., vector change) in locations determined by the inertial navigation system. Further, it can be appreciated that movement measured by one or more GPS receivers can be used with movement measured by the inertial navigation system to calculate an even more accurate vertical displacement. In such a configuration, the GPS input can be used as a reference by the inertial navigation system from which movement is measured or the displacement calculated from the GPS input can be used to verify, validate or correct the displacement calculated by the inertial navigation system. Using outputs from the GPS receiver 15, the accelerometer 17, and/or the gyroscope 19 may provide a displacement measurement accuracy of the platform 9 down to 5 mm or even less and, hence, the depth measurement in the borehole 2 may have this accuracy.

The teachings disclosed herein are also applicable to the platform 9 located on land. In the land based embodiment, the GPS receiver 16 coupled to the block 13 can be used to measure the displacement of the block 13 as the borehole 2 is being drilled and the drill string 6 is disposed further into the borehole 2. Hence, by summing the displacements measured using the GPS receiver 16, the length of the drill string 6 inserted into the borehole 2 and, thus, a depth measurement in the borehole 2 can be accurately calculated.

In order to improve the accuracy of the depth measurement for the land based platform 9, output from the accelerometer 18 can be used in conjunction with output from the GPS receiver 16 where the GPS receiver 16 is used to establish a reference and the accelerometer 18 is used to measure displacement from the established reference. In a marine environment, measurements of displacement of the block 13 by the GPS receiver 16 can be corrected or compensated for movement of the platform 9 by output from the GPS receiver 15. Similarly, for improved accuracy, output from the GPS receiver 16 may be used in conjunction with the output from the accelerometer 18 and/or the gyroscope 20 and output from the GPS receiver 15 can be used in conjunction with the output from the accelerometer 17 and/or the gyroscope 19 to correct the drill string displacement measured by the GPS receiver 16 and accelerometer 18 and/or gyroscope 20 combination to account for platform movement.

Figure 3:
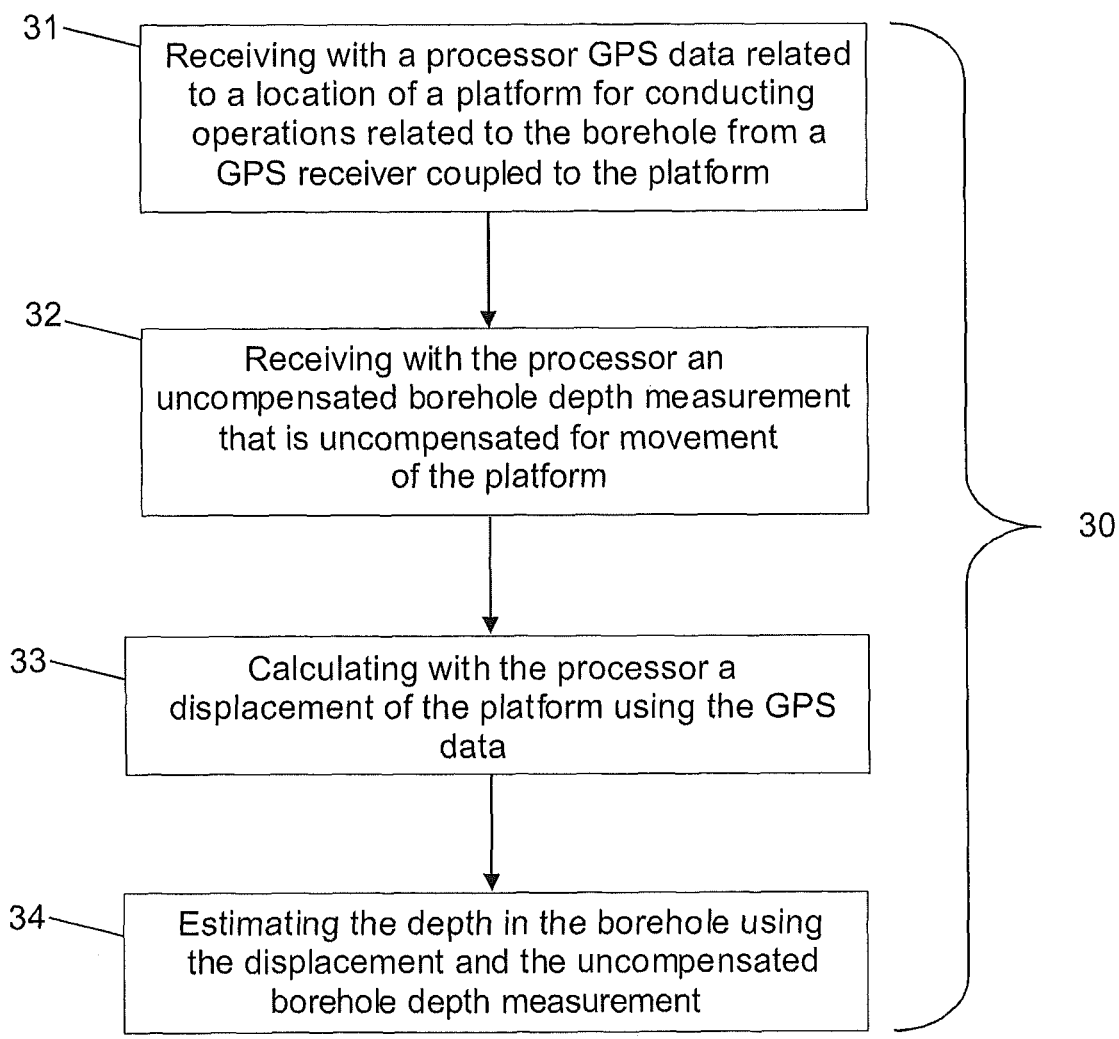
FIG. 3 is a flow chart of a method for performing measurements in the borehole.

FIG. 3 is a flow chart illustrating a method 30 for estimating a depth in a borehole penetrating the earth. Block 31 calls for receiving with a processor GPS data related to a location of a platform for conducting operations related to the borehole from a GPS receiver coupled to a platform. Block 32 calls for receiving with the processor an uncompensated borehole depth measurement that is uncompensated for movement of the platform. Block 33 calls for calculating with the processor a displacement of the platform using the GPS data. Block 34 calls for estimating the depth in the borehole using the displacement and the uncompensated borehole depth measurement. The method 30 can also include receiving with the processor acceleration and/or orientation measurements from an accelerometer and/or gyroscope, respectively, coupled to the platform and using the acceleration and/or orientation measurements to increase the resolution or accuracy of the calculated platform displacement.

It can be appreciated that the teachings disclosed herein may be particularly advantageous when borehole depth measurements for different functions have to be coordinated. In one or more embodiments, the borehole depth for one function may have to be the same as the borehole depth for another function. For example, perforation of a casing by a perforation tool may have to be performed based on logging data obtained from the downhole tool 10. In this situation, the borehole depth at which the perforation tool perforates the casing must be the same borehole depth at which the logging data of interest was obtained by the downhole tool 10. Similarly, the logging data for one type of measurement performed by the downhole tool 10 may have to be correlated by borehole depth to logging data obtained from another type of downhole tool 10 (e.g., resistivity data versus radiation data). The necessary accuracy for performing such work may be achieved using the GPS receiver(s) or GPS receiver(s) and accelerometer(s) and/or gyroscope(s) combination to compensate for platform movement.

It can be appreciated that teachings disclosed herein may also be employed in embodiments with deviated boreholes or in embodiments where a floating platform is not directly over the borehole. In these situations, application of applicable mathematical geometry or vector analysis may be used to correct for configurations that are deviated from the vertical.

In support of the teachings herein, various analysis components may be used, including a digital and/or an analog system. For example, the downhole electronics 11, the surface computer processing 12, the GPS receivers 15 and 16, the accelerometers 17 and 18, or the gyroscopes 19 and 20 may include the digital and/or analog system. The system may have components such as a processor, storage media, memory, input, output, communications link (wired, wireless, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or any combination of terms. The term "couple" relates to coupling a first component to a second component either directly or indirectly through an intermediate component.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for performing a physical borehole-related operation based on estimating a depth of a downhole tool in a borehole penetrating the earth and for estimating a rate of penetration into the earth, the apparatus comprising:

a platform that supports a carrier for conveying a downhole tool in the borehole, the downhole tool for performing the physical borehole-related operation based on estimating the depth of the downhole tool in the borehole;

a first global positioning system (GPS) receiver disposed on the platform, the first GPS receiver being configured to receive GPS signals for measuring a vertical displacement of the first GPS receiver disposed on the platform;

a processor coupled to the first GPS receiver disposed on the platform and configured to (i) estimate the depth of the downhole tool in the borehole using the GPS signals received by the first GPS receiver disposed on the platform for measuring the vertical displacement of the first GPS receiver disposed on the platform and (ii) output a signal based on the estimated depth to the downhole tool to perform the physical borehole-related operation based on an estimated depth of the downhole tool in the borehole; and a second GPS receiver coupled to the carrier at the platform and configured to provide second GPS data related to a vertical displacement of the second GPS receiver, wherein the processor is further configured to estimate a rate of penetration of the carrier into the earth using vertical displacement data from the first GPS receiver disposed on the platform and the second GPS receiver coupled to the carrier.

2. The apparatus according to claim 1, wherein the processor is configured to calculate a change in vertical location of the first GPS receiver.

3. The apparatus according to claim 2, wherein the processor is configured to correct a borehole depth measurement of the downhole tool using the calculated change in vertical location of the first GPS receiver disposed on the platform.

4. The apparatus according to claim 1, wherein the platform is configured to float on water above the borehole.

5. The apparatus according to claim 1, wherein the processor is further configured to compensate a rate of penetration of the carrier determined from the second GPS data using the GPS signals to provide a compensated rate of penetration to compensate for motion of the platform relative the borehole.

6. The apparatus according to claim 1, wherein the second GPS receiver is attached to a block of a drilling rig coupled to a drill string and configured to lift the drill string.

7. The apparatus according to claim 1, wherein the platform is disposed at a surface of the earth and the first GPS receiver disposed on the platform is further disposed at a drill string above the surface, and wherein the processor is further configured to estimate a rate of penetration of the drill string in the earth using the GPS signals.

8. The apparatus according to claim 1, further comprising an accelerometer coupled to the platform and configured to provide accelerometer data to the processor related to acceleration of the platform, wherein the accelerometer data is used in conjunction with the GPS signals to estimate the depth of the downhole tool in the borehole.

9. The apparatus according to claim 8, wherein the processor is further configured to establish a reference using the GPS signals and to estimate displacement of the platform from the reference using the accelerometer data.

10. The apparatus according to claim 8, further comprising a gyroscope coupled to the platform and configured to provide orientation data to the processor related to an orientation of the platform, wherein the orientation data is used in conjunction with the GPS signals and the accelerometer data to estimate the depth of the downhole tool in the borehole.

11. The apparatus according to claim 1, wherein the processor is further configured to receive measurement data using downhole telemetry from the downhole tool disposed in the borehole and configured to perform one or more measurements of a property.

12. The apparatus according to claim 11, wherein the processor is further configured to assign a measurement depth to each measurement in the received measurement data, the measurement depth being derived from the estimated depth of the downhole tool.

13. The apparatus according to claim 11, wherein the carrier comprises a wireline, a slickline, a drill string, or coiled tubing.

14. The apparatus according to claim 1, wherein the downhole tool is configured to perforate a casing disposed in the borehole using the estimated depth.

15. The apparatus according to claim 1, wherein the downhole tool comprises a drill bit.

16. A method for performing a borehole-related operation based on estimating a depth of a downhole tool in a borehole penetrating the earth and for estimating a rate of penetration into the earth, the method comprising:
disposing in the borehole a downhole tool that is coupled to a carrier and performs the physical borehole-related operation based on an estimated depth of the downhole tool in the borehole;
receiving first GPS data for measuring a vertical displacement of a platform that supports the carrier, the first GPS data being received from a first GPS receiver disposed on the platform, the receiving being performed using a processor;
estimating the depth of the downhole tool in the borehole using the first GPS data for measuring the vertical displacement of the platform and received from the first GPS receiver disposed on the platform, the estimating being performed by the processor;
outputting a signal based on the estimated depth using the processor to the downhole tool to perform the physical borehole-related operation
receiving second GPS data from a second GPS receiver coupled to the carrier at the platform, the second GPS data being related to a vertical displacement of the second GPS receiver; and
estimating a rate of penetration of the carrier into the earth using the first GPS data and the second GPS data.

17. The method according to claim 16, further comprising:
receiving an uncompensated borehole depth measurement that is uncompensated for movement of the platform;
calculating a displacement of the platform using the first GPS data; and
estimating the depth of the downhole tool in the borehole using the displacement and the uncompensated borehole depth measurement.

18. The method according to claim 16, further comprising receiving, using the processor, accelerometer data related to acceleration of the platform from an accelerometer coupled to the platform or orientation data related to orientation of the platform from a gyroscope coupled to the platform.

19. The method according to claim 18, further comprising establishing, using the processor, a reference using the first GPS data and estimating displacement of the platform from the reference using the accelerometer data or the orientation data, wherein the displacement is used to correct a borehole depth measurement of the downhole tool using the estimated displacement.

20. The method according to claim 16, wherein the first GPS receiver disposed on the platform is coupled to a block of a drilling rig that is connected to the drill string and the method further comprises determining, using the processor, the depth of the downhole tool in the borehole using displacement data related to displacement of the first GPS receiver disposed on the platform.

21. The method according to claim 20, further comprising determining, using the processor, the depth of the downhole tool in the borehole using displacement data related to an accelerometer or gyroscope co-located with the first GPS receiver disposed on the platform.

22. The method according to claim 16, further comprising receiving, using the processor, logging measurements from the downhole tool disposed in the borehole and assigning a measurement depth to each received logging measurement using the estimated depth.

23. The method according to claim 16, further comprising correlating logging data for one type of measurement obtained by the downhole tool by borehole depth to other logging data obtained by another type of downhole tool.

24. A non-transitory computer readable medium comprising computer executable instructions for performing a physical borehole-related operation based on estimating a depth of a downhole tool in a borehole penetrating the earth and for estimating a rate of penetration into the earth by causing apparatus to implement a method comprising:
receiving from a first GPS receiver, disposed on a platform that supports a carrier, first GPS data for measuring a vertical displacement of the platform, wherein the downhole tool is coupled to the carrier;

estimating the depth of the downhole tool in the borehole using the first GPS data for measuring the vertical displacement of the platform received from the first GPS receiver disposed on the platform;

outputting a signal based on the estimated depth to the downhole tool to perform the physical borehole-related operation receiving second GPS data from a second GPS receiver coupled to the carrier at the platform, the second GPS data being related to a vertical displacement of the second GPS receiver; and estimating a rate of penetration of the carrier into the earth using the first GPS data and the second GPS data.

* * * * *